United States Patent [19]

Hoehn

[11] 3,818,251

[45] June 18, 1974

[54] MONOLITHIC INTEGRATED MASTER-SLAVE FLIP-FLOP CIRCUIT

[75] Inventor: Wolfgang Hoehn, Freiburg, Germany

[73] Assignee: ITT Industries, Inc., New York, N.Y.

[22] Filed: June 12, 1973

[21] Appl. No.: 369,342

[52] U.S. Cl. .......... 307/291, 307/221 R, 307/225 R

[51] Int. Cl. .......... H03k 3/286

[58] Field of Search .......... 307/289, 291, 292, 238, 307/220 R, 221 R, 225 R; 328/37, 39, 41, 48, 191, 194, 196, 200, 206

[56] References Cited

UNITED STATES PATENTS

| | | | |
|---|---|---|---|
| 3,384,766 | 5/1968 | Kardash | 307/292 |
| 3,440,449 | 4/1969 | Priel et al. | 307/291 |
| 3,591,856 | 7/1971 | Kalb | 307/291 X |
| 3,603,819 | 9/1971 | Molle | 307/291 |
| 3,621,289 | 11/1971 | Sasaki | 328/206 X |

*Primary Examiner*—Rudolph V. Rolinec
*Assistant Examiner*—L. N. Anagnos
*Attorney, Agent, or Firm*—John T. O'Halloran; Menotti J. Lombardi, Jr.; Vincent Ingrassia

[57] ABSTRACT

This invention relates to a monolithically integrable master-slave flip-flop comprising an input stage, a master stage, a coupling stage and a slave stage. To reduce current consumption, the coupling between the master, slave and input is effected by a single emitter transistor and a double emitter transistor.

4 Claims, 5 Drawing Figures

MONOLITHIC INTEGRATED MASTER-SLAVE FLIP-FLOP CIRCUIT

BACKGROUND OF THE INVENTION

This invention relates to monolithically integrable master-slave flip-flop circuits. They consist of the partial circuits, namely an input gate connecting the inputs A and B to the master portion. This is followed by the coupling stage connecting the master portion to the slave portion. The outputs Q, $\overline{Q}$ of the slave portion simultaneously act as the outputs of the entire master-slave flip-flop circuit. By the dash over the letter Q it is supposed to be indicated that the digital information as occurring at the two inputs Q and $\overline{Q}$ is inverse in relation to one another. Accordingly, if the digital information "1" is present at the output Q, the digital information "0" is present at the output $\overline{Q}$.

Master-slave type flip-flop circuits are clock-pulse controlled flip-flop circuits, i.e. reversal from the one into the other switching state of the flip-flop circuit is effected as a function of the digital signals applied to the inputs A, B, only during the period of a positive clock pulse. This clock pulse, for effecting the intended mode of operation as regards its amplitude, must be capable of exceeding two voltage thresholds successively which are inherent to both the coupling stage and the input gate, with the threshold voltage of the coupling stage being lower than that of the input gate. By the clock pulse it is effected that the master and the slave portion are connected to one another with respect to direct current via the coupling stage below the threshold voltage of the coupling stage, whereas both the master portion and the inputs are only connected to one another with respect to direct current via the input gate above the threshold voltage of the input gate.

Both the master portion 2 and the slave portion 4 consist of transistors which, with respect to their base and collector electrodes, are cross-coupled and which, with respect to their emitter electrodes, are connected together, as is quite generally the case with flip-flop circuits. Accordingly, the invention relates to a master-slave flip-flop circuit of the type which is monolithically integrated with the aid of bipolar transistors, comprising a master portion and a slave portion respectively consisting of two transistors which are cross-coupled with respect to their base and collector electrodes, and which are connected together as regards their emitter electrodes, and consisting further of a coupling stage connecting the master to the slave portion, and of an input gate connecting the master portion to the inputs, with all four of these circuit portions being interconnected in such a way that the master and the slave portions are only connected to one another with respect to direct current via the coupling stage below a threshold voltage inherent to the coupling stage, and that the master portion and the inputs are connected to one another with respect to direct current via the input gate only when exceeding a threshold voltage inherent to the input gate, with the threshold voltage of the coupling stage being lower than that of the input gate, and with the threshold voltages each being once in turn exceeded by a clock pulse while falling below it the next time.

The master-slave flip-flop circuit as known from the aforementioned methods, is relatively expensive and, besides the transistors acting as active components or devices, still contain a considerable number of diodes, zener diodes and resistors. In consequence of this, the necessary supply voltage is in the order of 10 volts. Accordingly, when subjecting this known type of circuit arrangement to monolithic integration, there will thus be required different dimensionings with respect to the steps of diffusion necessary for manufacturing the individual components or devices.

SUMMARY OF THE INVENTION

It is the object of the present invention to provide a master-slave flip-flop circuit which, owing to the reduced number of individual components required, is much more uncritical as regards the diffusion parameters to be observed, which occupies less crystal surface, and which is suitable for being operated with a lower supply voltage at an extremely low current consumption (100 nA per master-slave flip-flop stage).

According to a broad aspect of the invention there is provided a monolithically integrated master-slave flip-flop comprising a source of supply voltage, a source of clock pulses, first and second inputs, first and second constant current sources, first and second master transistors having their base and collector electrodes cross coupled and their emitter electrodes coupled together, said collector electrodes coupled to said first constant current source and said emitters of said first and second master transistors coupled to said source of clock pulses, first and second slave transistors having the same conductivity as said master transistors and having base and collector electrodes cross coupled and emitter electrodes coupled together, first and second transistors having the same conductivity as said master transistors, said first and second coupling transistor each consisting of one double emitter transistor, with the first emitter of said first and second coupling transistor coupled to the respective collector of one of said first and second master transistors and the second emitter thereof being connected to the respective collector of one of said first and second slave transistors, and with the base of said first and second coupling transistor connected to said second constant current source, and first and second input gate transistors having the same conductivity as said master transistors each having a base connected to the emitter of said first and second master transistors having a collector connected to the collector of one of said first and second master transistors and each having an emitter coupled to one of said first and second inputs.

The inventive master-slave flip-flop circuit and modifications thereof for the use in shift registers or in binary frequency dividers will now be explained in greater detail with reference to the accompanying drawings, in which:

DESCRIPTION OF THE PREFERRED EMBODIMENT

Figure 1:
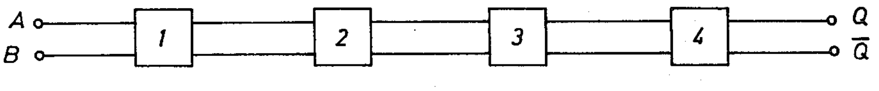
FIG. 1 is a functional block diagram of a master-slave flip-flop circuit.

FIG. 1 illustrates the principle of master-slave flip-flop circuits. They consist of an input gate 1 connecting inputs A and B to master portion 2. Coupling stage 3 connects master portion 2 to the slave portion 4.

Figure 2:
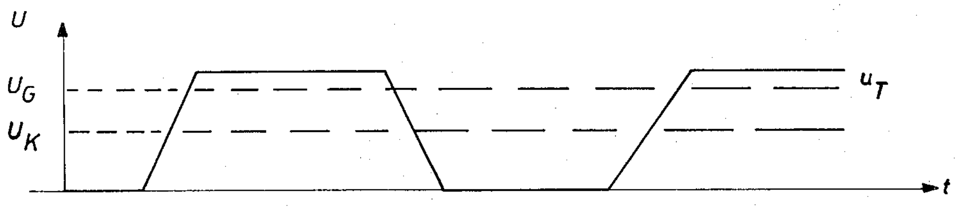
FIG. 2 shows the clock pulse as a function of time with the associated threshold voltages of the coupling and input stages.

FIG. 2 shows the clock pulse as a function of time, together with the associated threshold voltages of both the coupling stage and the input gate. In cases where the amplitude of the clock pulse $u_T$ is lying below the threshold voltage $U_K$ of the coupling stage, the information as contained in the master portion, is taken over by the slave portion because, as already mentioned, in this particular case both the master and the slave portion are connected to one another via the coupling stage. In cases where the amplitude of the clock pulse $u_T$ exceeds the threshold voltage $U_K$ of the coupling stage, but is still lying below the threshold voltage $U_G$ of the input gate, the information items just still present in the master and the slave portion at this particular time position, will remain to be stored in both portions until the amplitude of the clock pulse $u_T$ exceeds the threshold voltage $U_G$ of the input gate. At this time position the information as applied to the inputs A, B is taken over by the master portion because, as already mentioned, the inputs are connected to the master portion via the input gate.

The dropping part of the amplitude of the clock pulse then first of all falls below the threshold voltage $U_G$ of the input gate, on account of which the inputs A, B are separated from the master portion, so that the now present information will remain to be stored in the master and the slave portion. Upon further dropping of the amplitude of the clock pulse, the latter will fall short of the threshold voltage $U_K$ of the coupling stage, so that now both the master portion and the slave portion are reconnected again to one another via the coupling stage, thus causing the information of the master portion to be taken over by the slave portion.

Figure 3:
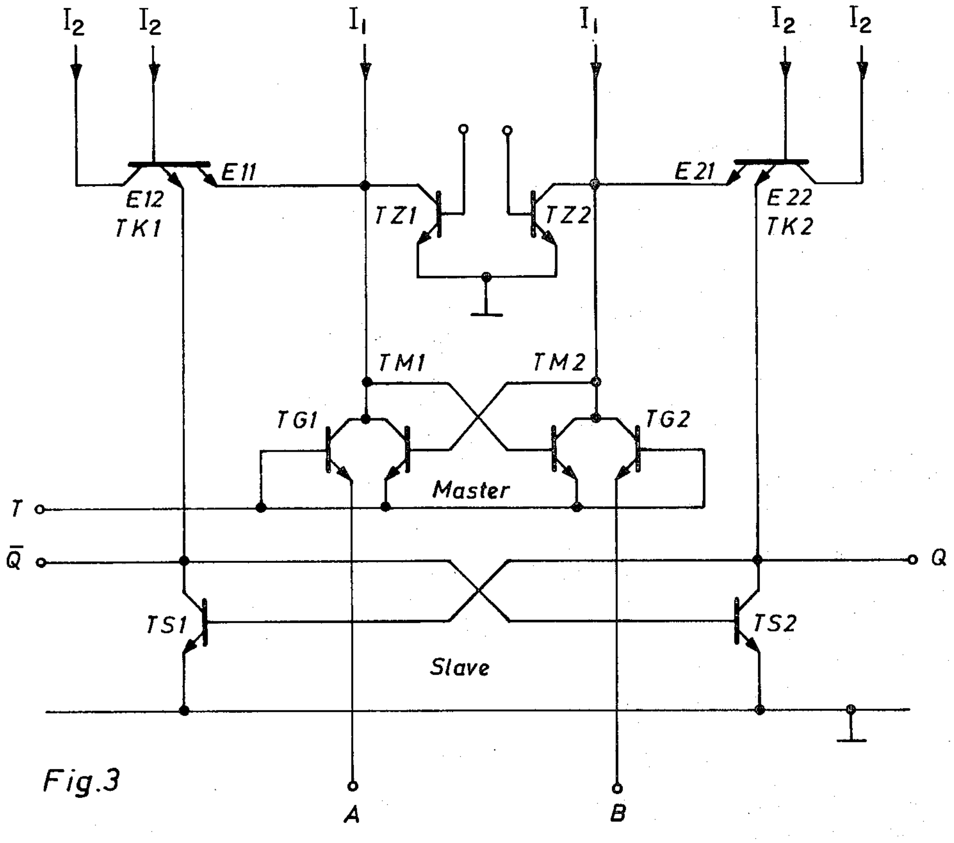
FIG. 3 shows the circuit diagram of the inventive master-slave flip-flop circuit with an optional further improvement.

The master-slave flip-flop circuit shown in FIG. 3 is composed of the master portion comprising the transistors TM1 and TM2, of the slave portion comprising the transistors TS1 and TS2, of the coupling stage comprising the two double-emitter transistors TK1 and TK2, and of the input gate comprising the transistors TG1 and TG2. The transistors TZ1 and TZ2 contained additionally in FIG. 3, may be provided for optionally. The function of these transistors will still be explained hereinafter.

The transistors of both the master portion TM1, TM2 and of the slave portion TS1, TS2, are cross-coupled as regards their base and collector electrodes, i.e. the base of transistor TM1 or TS1 is connected to the collector of transistor TM2 or TS2, while the base of transistor TM2 or TS2 is connected to the collector of transistor TM1 or TS1 respectively. The emitters of the master transistors TM1, TM2 are connected to one another just like the emitters of the slave transistors TS1, TS2.

The two double emitter transistors TK1, TK2 of the coupling stage are connected in such a way that the first emitter E11 or E21 is connected to the collector of the associated master transistor respectively, i.e. the first emitter E11 of the double emitter transistor TK1 is connected to the collector of the master transistor TM1 while the first emitter E21 of the double emitter transistor TK2 is connected to the collector of the master transistor TM2. The second emitter E12 or E22 of the double emitter transistors TK1, TK2 is connected to the corresponding collector of the slave transistors TS1, TS2 respectively, i.e. the second emitter E12 of the double emitter transistor TK1 is applied to the collector of the slave transistor TS1 while the second emitter E22 of the double emitter transistor TK2 is connected to the collector of the slave transistor TS2.

The transistors TG1, TG2 of the input gate are applied with their collectors to corresponding collectors of the master transistors TM1, TM2, and with their base electrodes to the emitters of these transistors which are connected to one another. Accordingly, the collector of the gate transistor TG1 is connected to the collector of the master transistor TM1. In the same way the collector of the gate transistor TG2 is applied to the collector of the master transistor TM2. The emitter of the gate transistor TG1 is connected to the input A, and the emitter of the gate transistor TG2 is connected to the input B.

The interconnected base electrodes of the gate transistors TG1, TG2 and emitter electrodes of the master transistors TM1, TM2 are connected to the clock pulse input T to which, in the operational case, there is applied the clock pulse $u_T$. As outputs Q, $\overline{Q}$ there are used the collectors of the slave transistors TS2, TS1 or optionally the collectors of the double emitter transistors TK1, TK2.

The base and collector electrodes of the double emitter transistors TK1, TK2 are applied to constant current source $I_1$. The collectors of the master transistors TM1, TM2 as connected to the collectors of the gate transistors TG1, TG2 and the emitters E11, E21 of double emitter transistors TK1, TK2; are respectively applied to constant current source $I_1$. The monolithic integrated master-slave flip-flop circuit according to the invention can be realized in a particularly simple manner with respect to these sources of constant current when the currents as supplied by the constant current sources I or the resistance values of the resistors are identical.

Moreover, in FIG. 3 there are shown the additional transistors TZ1, TZ2 which are intended for optional use. The collectors of these transistors are connected to the corresponding collectors of the master transistors TM1, TM2, while the emitters thereof are jointly connected to the zero point of the circuit (ground) to which, moreover, there are also applied the interconnected emitters of the slave transistors TS1, TS2. The base electrodes of these additional transistors TZ1, TZ2 each extend to a further input C, D. Via these inputs the circuit can be preset or reset respectively independently of the signals applied to the inputs A, B.

For the purpose of explaining the mode of operation of the inventive master-slave flip-flop circuit it will be assumed that the digital signal 0 is applied to the input A, and the digital signal 1 is applied to the input B, with the digital signal 1 being equal to or greater than the base-emitter threshold voltage of the gate transistor TG2. This base-emitter threshold voltage which likewise occurs at the gate transistor TG1, is identical in the inventive arrangement to the threshold voltage $U_G$ of the input gate as mentioned hereinbefore. As soon as the amplitude of the clock pulse $u_T$ exceeds this threshold voltage, the gate transistor TG1 is switched on and will trigger the master portion in such a way that the master transistor TM1 is rendered conductive, while the master transistor TM2 is rendered non-conductive. When thereupon the amplitude of the clock pulse falls again below the threshold voltage level $U_G$, the gate transistor TG1 is again rendered non-conductive. Upon further reduction of the amplitude of the clock pulse, the potential at the collector of the slave transistor TS1 is reduced to such an extent via the double emitter transistor TK1, that the slave portion will be triggered, thus causing the slave transistor TS1 to be rendered conductive while the slave transistor TS2 is blocked. In cases where the slave portion is found to be already in this condition, the clock pulse will have no influence upon this condition or state.

The threshold voltage $U_K$ of the coupling stage is with certainty smaller than the difference between the base-emitter threshold voltage of the slave transistor TS2 and the collector-emitter saturation voltage of the master transistor TM1. Accordingly, the function of the inventive master-slave flip-flop circuit is completely independent of the slope (rise and fall times) of the clock pulses.

Figure 4:
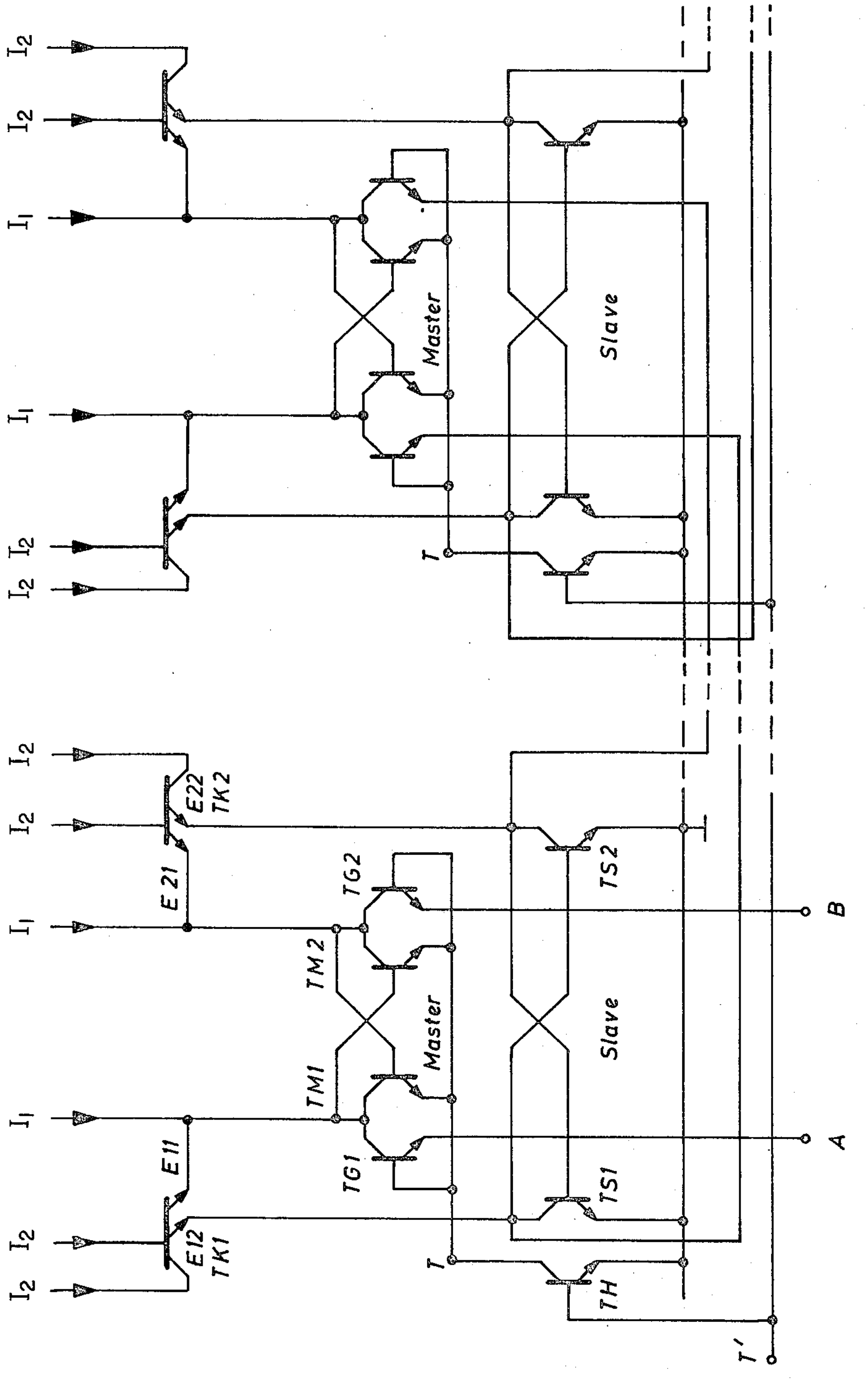
FIG. 4 shows the modification of the inventive master-slave flip-flop circuit for the use in shift registers.

FIG. 4 shows the first and second stages of a shift register which, in each of its stages, contains one inventive type of master-slave flip-flop circuit. For this purpose, the circuit is modified in such a way that the clock pulses are applied to the clock pulse inputs T via each time one auxiliary transistor TH whose collector is connected to the respective clock pulse input T, and whose emitter is connected to the zero point of the circuit, while the clock pulses are applied to the base electrode thereof via the thus formed new clock pulse input T'.

With the exception of the first stage of the shift register, the inputs of each shift register stage are connected directly to the collectors of the slave transistors of the respective preceding master-slave flip-flop circuit. Accordingly, this shift register is one which, as regards the clock pulses, is suitable for a serial input and a parallel or serial output. Parallel input, however, is also possible at times during which the amplitude of the clock pulse $u_T$ equals zero. In that case the additional transistors according to FIG. 3 will have to be provided for in the corresponding stages.

Figure 5:
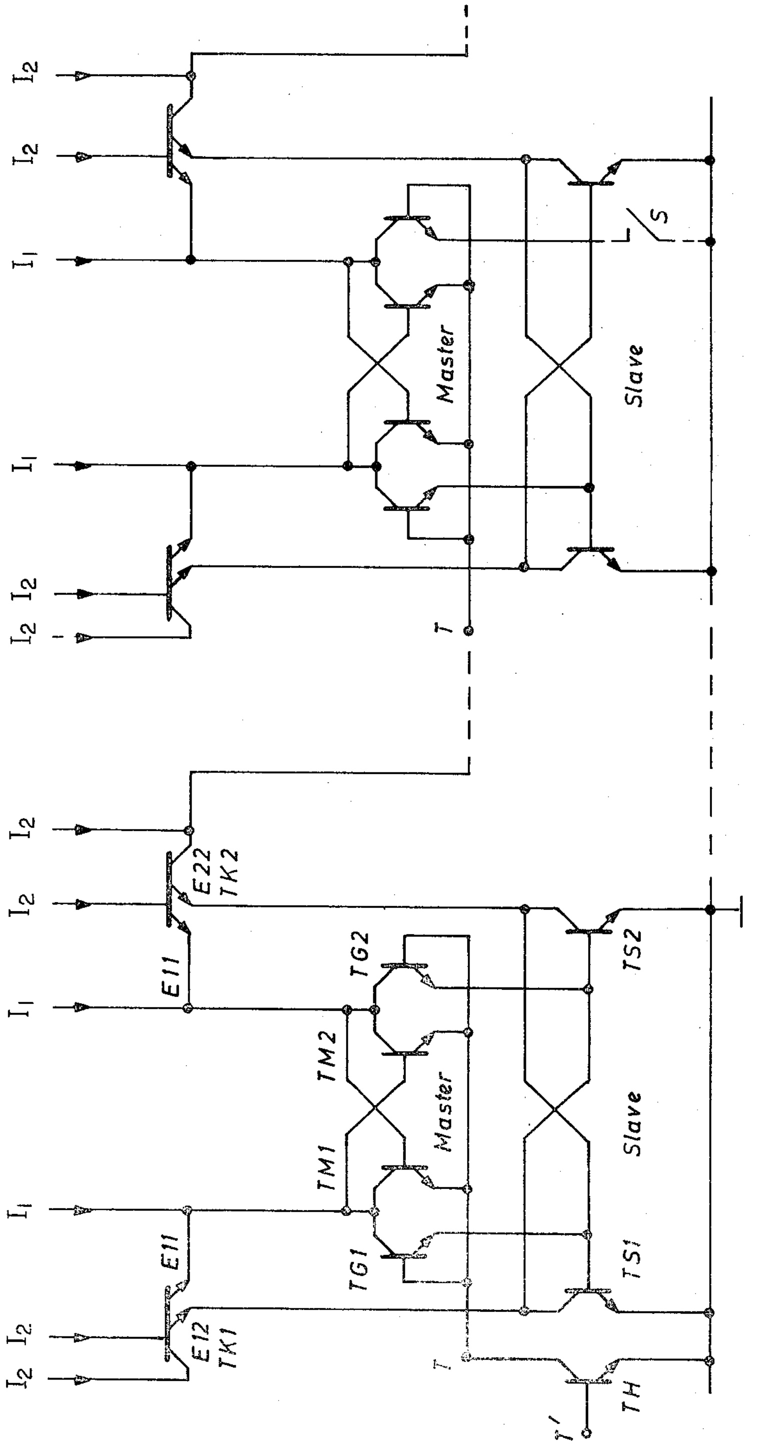
FIG. 5 shows the modification of the inventive master-slave flip-flop circuit for the use in binary frequency dividers.

FIG. 5 shows a binary frequency divider circuit for dividing the frequency of the clock pulses by using the inventive master-slave flip-flop circuit. For this purpose the master-slave flip-flop circuit of the individual frequency divider stages is modified in such a way that the clock pulse input T of the first frequency divider stage, as in the case of the shift register according to FIG. 4, is again preceded by the base-collector path of the auxiliary transistor TH, with the collector thereof being connected to the clock pulse input T, and the emitter thereof being connected to the zero point of the circuit, whereas the clock pulses, the frequency of which is to be divided, are applied to the new clock pulse input T' which is identical to the base of the auxiliary transistor.

Since the switching stage of the individual frequency divider stages is merely determined by the pulses of the clock frequency, the inputs A and B of the arrangement according to FIG. 3 are connected in the arrangement according to FIG. 5 to the base of the respective slave transistor, i.e. the emitter of the gate transistor TG1 is connected to the base of the slave transistor TS1, and the emitter of the gate transistor TG2 is connected to the base of the slave transistor TS2 directly.

As the output for coupling the subsequently following frequency divider stage there is used in the arrangement according to FIG. 5, the collector of the double emitter transistor TK2 which is connected to the clock pulse input of the subsequently following frequency divider stage.

The dash-type connecting lines shown in FIG. 5 indicate that the master-slave flip-flop circuit shown in the right-hand portion of FIG. 5 is any one frequency divider stage following the first frequency divider stage shown in the left-hand portion of the drawing.

As a rule, in producing such monolithic integrated frequency divider circuits, a maximum number of stages is provided for and manufactured, so that the division ratio is unambiguously determined as the $n^{th}$ power of the number 2 ($n$ = number of stages). In order to make it also possible for the user to realize a smaller division ratio with the given finished circuit, it is provided for in a further embodiment of the frequency divider circuit that in one or more stages, the base of that particular slave transistor associated with the double-emitter transistor supplying the output pulse, is connected to the zero point of the circuit by means of a switch S. In this way, the thus modified frequency divider stage will not divide the frequency of the input pulses as applied to the clock pulse input T, i.e. that this stage divides by the factor 1. As a switch S, of course, it is possible to provide an electronic circuit in the form of a further transistor which, by being controlled by a voltage from outside the integrated circuit, will safeguard the short-circuiting of the base-emitter path of the associated slave transistor.

Accordingly, it is only necessary for the manufacturer of the integrated circuit to produce one single frequency divider type, while it is left to the user to select the division ratio.

With respect to the inventive types of master-slave flip-flop circuits used in such frequency divider circuits it is particularly advantageous for the surface of the base-emitter-pn-junction of the gate transistors TG1, TG2 to be twice to three times greater than that of the slave transistors. In this way, even under the most unfavorable variations of the electrical parameters of the base-emitter path of these transistors, it is still safeguarded that the subsequently following frequency divider stage will be triggered reliably.

The advantages of the inventive master-slave flip-flop circuit reside above all in the fact that an operating current can be chosen which is favorable, quite depending on the intended use, in other words, the circuit arrangement has a wide range of operating current. Moreover, the circuit arrangement is already capable of operating from supply voltages of 1 to 1.8 volts onwards, with the magnitude of this voltage being dependent upon the chosen current. The current consumption, quite depending on the respective operational case, may be adjusted to range between 100 nA and some mA. When used in frequency dividers, the maximum clock frequency is in the order of 2 MHz. Moreover, the circuit is unobjectionably operable at temperatures ranging from −70° to +140°C.

It should still be noted that the inventive master-slave flip-flop circuit, when used in shift registers of the kind described hereinbefore, can be simplified in such a way that the two double emitter transistors are replaced by respectively one transistor with only one emitter, with the base thereof again being connected to the source of constant current or to the resistor, with the collector thereof being connected to the collector of the associated slave transistor, and with the emitter thereof being connected to the collector of the associated master transistor.

While I have described above the principles of my invention in connection with specific apparatus, it is to be clearly understood that this description is made only by way of example and not as a limitation to the scope of my invention as set forth in the objects thereof and in the accompanying claims.

I claim:

1. A monolithically integrated master-slave flip-flop comprising:

a source of supply voltage;

a source of clock pulses;

first and second inputs;

first and second constant current sources;

first and second master transistors having their base and collector electrodes cross-coupled and their emitter electrodes coupled together, said collector electrodes coupled to said first constant current source, and said emitters of said first and second master transistors coupled to said source of clock pulses;

first and second slave transistors having the same conductivity as said master transistors and having base and collector electrodes cross-coupled and emitter electrodes coupled together;

first and second coupling transistors having the same conductivity as said master transistors, said first and second coupling transistor each consisting of one double emitter transistor, with the first emitter of said first and second coupling transistor coupled to the respective collector of one of said first and second master transistors and the second emitter thereof being connected to the respective collector of one of said first and second slave transistors, and with the base of said first and second coupling transistor connected to said second constant current source; and first and second input gate transistors having the same conductivity as said master transistors, each having a base connected to the emitter of said first and second master transistors having a collector connected to the collector of one of said first and second master transistors and each having an emitter coupled to one of said first and second inputs.

2. A monolithically integrated master-slave flip-flop according to claim 1 further comprising first and second additional transistors each having a collector coupled to the collector of one of said first and second master transistors, each having an emitter coupled to the zero point of the circuit, and each having a base serving as the setting and resetting inputs.

3. A monolithically integrated master-slave flip-flop according to claim 1 for use in shift registers employing a plurality of master-slave flip-flops further comprising an auxiliary transistor having a collector coupled to said source of clock pulses, having an emitter coupled to the zero point of the circuit and a base coupled to a signal having a frequency which is to be divided, wherein clock pulses are applied to each of said plurality via the base-collector path of said auxiliary transistor, and wherein with the exception of the first of said plurality, the inputs of the further master-slave flip-flops are directly coupled to the collectors of the slave transistors of the preceding master-slave flip-flop.

4. A monolithically integrated master-slave flip-flop according to claim 1 for use in a binary frequency divider employing a plurality of series-connected master-slave flip-flop circuits for dividing the clock pulse frequency further comprising an auxiliary transistor having a collector coupled to said source of clock pulses and an emitter coupled to the zero point of the circuit, wherein the clock pulses are applied to the clock pulse input of the first master-slave flip-flop circuit via the base-collector path of said auxiliary transistor, and wherein the emitters of said first and second gate transistors are each directly coupled to the base of one said first and second slave transistors, and wherein the clock pulse input of each of the following master-slave flip-flop circuits is directly coupled to the collector of one of said first and second coupling transistors of the preceding master-slave flip-flop circuit.

* * * * *